United States Patent [19]
Coroneos

[11] 3,956,979
[45] May 18, 1976

[54] MULTI-ELEMENT VERTICAL ROTISSERIE

[76] Inventor: James H. Coroneos, Frederick and Thistle Roads, Baltimore, Md. 21228

[22] Filed: Jan. 24, 1975

[21] Appl. No.: 543,690

[52] U.S. Cl. .............................. 99/421 V; 99/446; 99/447
[51] Int. Cl.² ........................................ A47J 37/04
[58] Field of Search .................. 99/421, 339–340, 99/419–420, 443, 446, 447; 126/59, 59.5

[56] References Cited
UNITED STATES PATENTS

| | | | |
|---|---|---|---|
| 1,543,212 | 6/1925 | Kurrell et al. | 99/443 UX |
| 2,565,786 | 8/1951 | Spartalis | 99/421 P |
| 2,581,570 | 1/1952 | Amanatides | 99/421 V |
| 2,897,746 | 8/1959 | Hilgers | 99/443 R |
| 3,196,776 | 7/1965 | Norton | 99/421 P |
| 3,273,489 | 9/1966 | Wilson | 99/339 X |
| 3,604,341 | 9/1971 | Coroneos | 99/421 V |
| 3,744,403 | 7/1973 | Castronuovo | 99/421 V |
| 3,817,164 | 6/1974 | Hintze | 99/421 V |

FOREIGN PATENTS OR APPLICATIONS

| | | | |
|---|---|---|---|
| 88,446 | 12/1966 | France | 99/421 P |
| 908,645 | 10/1962 | United Kingdom | 99/421 P |
| 1,162,985 | 2/1964 | Germany | 99/421 P |

*Primary Examiner*—Robert W. Jenkins
*Assistant Examiner*—Arthur O. Henderson
*Attorney, Agent, or Firm*—Walter G. Finch

[57] ABSTRACT

The invention generally relates to vertical rotisserie structures wherein arcuate heating elements direct heat onto a foodstuff held on a spit mounted in the general focus of the heating elements. The present invention particularly provides a plurality of cooking platforms vertically arranged on a rotatable spit, each platform holding a plurality of portion-controlled foodstuffs for heating by opposed arcuate heating elements. The portions of the foodstuff are mounted on passive pivots which are caused to rotate in response to a fixed structural bias on rotation of the spit itself.

16 Claims, 4 Drawing Figures

MULTI-ELEMENT VERTICAL ROTISSERIE

BACKGROUND AND SUMMARY OF THE INVENTION

The invention relates to rotisserie devices of the type which comprise vertically stacked, arcuate heating elements having a vertical line focus wherein a rotatable spit is mounted. A foodstuff such as meat is usually impaled on the vertically disposed spit and caused to rotate in opposed relation to the heating element, the heating element effectively focusing heat thereon to evenly cook said meat. Drippings from meat or other foodstuffs being so roasted fall downwardly at right angles to the heating elements rather than onto the heating elements as is the case in non-vertical rotisseries.

Prior vertical rotisseries can generally be exemplified by U.S. Pat. No. 3,604,341, issued to me, wherein a vertically-disposed rotatable spit holds a large portion of meat for roasting by focused radiant heat in a vertical plane. The present rotisserie exhibits substantial advantages over the device of my prior patent. In particular, a certain degree of skill is necessary to carve equal portions from the prior device without removal of the spit from the device. With the present device, exact portions of the food to be roasted are pre-cut and mounted about the periphery of disc-like platforms, which platforms are mounted on a central shaft, or spit, and rotate with the shaft. Additionally, the individual portions are caused to sequentially rotate relative to the platform in order to evenly cook the portions.

Given the general structure outlined, it can be seen and will be seen in light of the following detailed description of the invention that a primary object of the invention is to provide a vertical rotisserie particularly suited for table top use wherein individual portions of a foodstuff can be roasted on rotating disc-like platforms, the portions themselves intermittantly and sequentially rotating relative to the platform to evenly cook said portions.

It is also an object of the invention to provide a motor driven rotisserie wherein the motor is mounted in continuous engagement with the rotating shaft carrying the circular platforms, so that the motor does not have to be connected and disconnected when changing from manual to powered rotation of the shaft.

It is another object of the invention to provide a rotisserie wherein the heating can be graduated along the length of the rotisserie spit so that foodstuffs are different zones along the spit may be roasted to different degrees, the foodstuffs in the case of meats additionally being self-basting due to their vertical orientation.

It is a further object of the invention to provide a rotisserie wherein certain of the vertically arranged heating elements can be turned off when foodstuffs on that platform opposing said heating elements are removed.

It is a still further object of the invention to provide a rotisserie wherein certain of the vertically arranged heating elements can be quickly removed from the rotisserie for repair and replaced by a new heating element with a minimum of disruption to the complete cooking operation.

Other objects include structural provisions for directing drippings from the roasting foodstuffs to centrally located collection means and structural provision for removing the cooking platforms from the rotating shaft without the need for removing the shaft from the rotisserie, which objects and additional objects will become better understood and known in light of the following detailed description of the preferred embodiments.

DESCRIPTION OF THE PREFERRED EMBODIMENTS

Figure 1:
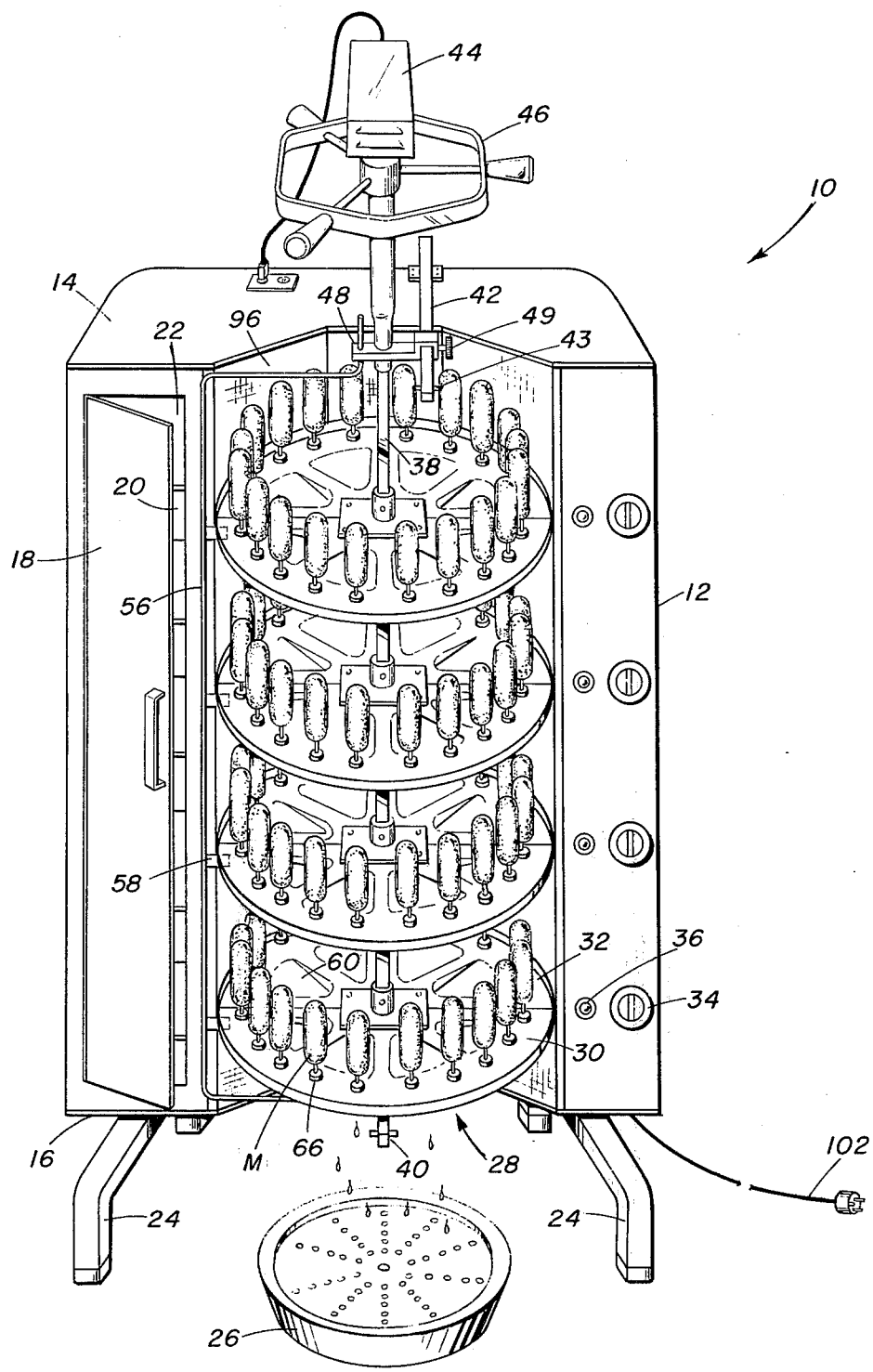
FIG. 1 is a perspective view of the improved rotisserie incorporating the novel features of the invention.

Referring to the drawings and particularly now to FIG. 1, a rotisserie unit is seen at 10 to comprise a hollow main body 12 having top and bottom plates 14 and 16 enclosing the upper and lower ends respectively of the body 12. The body 12 is essentially shaped in the manner of prior vertical rotisserie structures such as is disclosed by me in U.S. Pat. No. 3,604,341, with heating assemblies 88 being located in wide-mouthed U-shaped recess in the body. The body 12 would typically be constructed of stainless steel. The body 12 of the present rotisserie unit 10 is provided with a warming oven 22 having shelves 20 therein which are accessible through a door 18. The warming oven 22 is heated by the heating assemblies 88 as an indirect consequence of the roasting action thereof. Thus, foodstuffs such as buns, breads, or the like can be wamred in the oven 22 at no additional energy expenditure rather than being warmed in separate ovens intended for such purposes.

Figure 3:
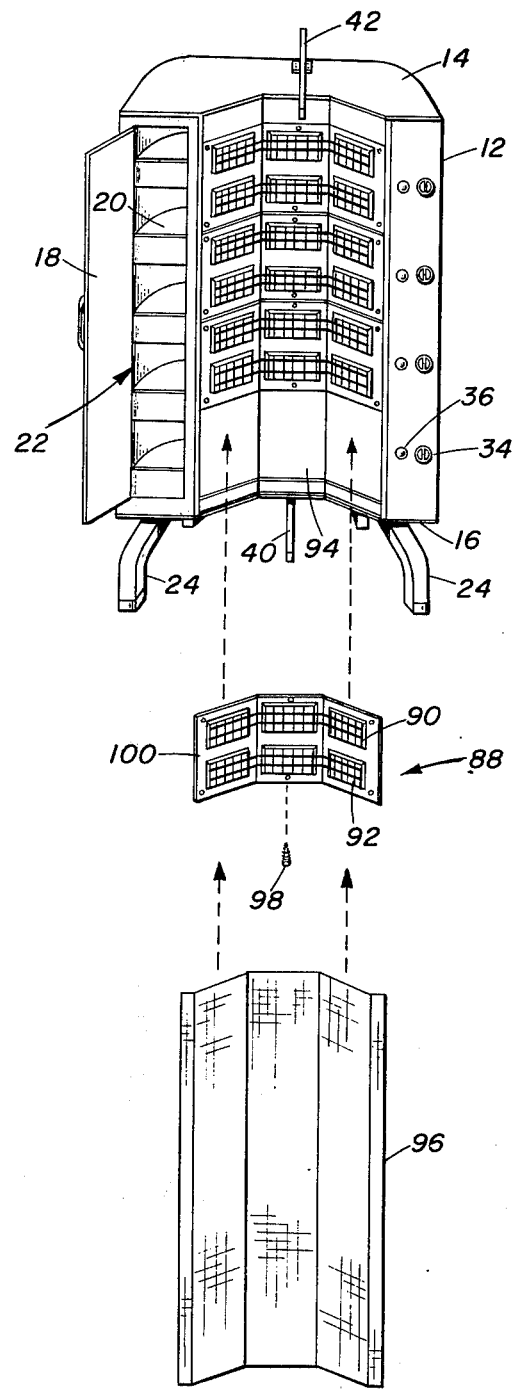
FIG. 3 is an assembly view in perspective of the heating elements and the body of the rotisserie; and, FIG. 4 is an idealized perspective illustrating the replacement of the multiple platform spit assembly with a standard spit.

The body 12 of the rotisserie unit 10 is further fitted with legs 24 which mount on the bottom plate 16 in a known fashion. Referring also to FIG. 3, it can be seen that the top plate 14 has a top spit support rod 42 attached thereto, the rod 42 extending forwardly of the body 12. The rod 42 slidably mounts a bracket 48 thereon, the position of which bracket 48 can be adjusted along the length of the rod 42 by means of a locking knob 52. A set screw 43 is disposed on the outer end of the rod 42 to prevent unintended movement of the bracket 48 from the rod. The bracket 48 mounts a drive shaft 86 which holds and drives a spit 38 in a manner to be described hereinafter. In order to complete the description of the body 12 and the structure permanently attached thereto, it is sufficient to understand at this point in the description of the invention that the spit 38 extends vertically downwardly from mounting relation with the rod 42 to mounting contact with a bottom spit support rod 40, which rod 40 is attached to the bottom plate 16 and extends forwardly of the rotisserie body 12 in vertical alignment with the spit 38 and the structure mounting the spit on the bracket 48. The rod 40 is fitted with a set screw 41 on its outer end which functions in the same manner as the screw 43 on the rod 42. The spit 38 is mounted essentially between the two support rods 40 and 42 for rotation in opposed relation to the heating assemblies 88. Each heating assembly 88 consists of an angled metal plate 100 of a conformation which allows the back of the plate 100 to fit flushly against an insulative backing 94 which follows the angled contours of the recess in the body 12. Each of the plates 100 has a plurality of ceramic insulator blocks 90 regularly disposed over its face, with heater wires 92 being affixed to the blocks 90 in a known fashion. The heating assemblies 88 thus formed are attached within the recess in the body 12 of the rotisserie unit 10 by means of screws 98, each of the assemblies 88 heating separate, vertically spaced zones along the length of the spit 38. When repair to one of the heating assemblies 88 is necessary, the faulty assembly 88 can be easily removed by loosening the screws 98. A replacement assembly 88 can then be quickly installed to minimize "down-time" of the unit 10. The heating assemblies 88 can be protected from the splatter of cooking foods on the spit 38 and from inadvertent contact with cooking or carving utensils by placement of a screen 96 over the full face of the recess in the body 12. The screen 96 is configured at its edges to "snap" onto mating interlocking structure (not shown) on the body 12. The heating assemblies 88 are individually controlled by control knobs 34 which regulate electrical power from power cord 102 to the assemblies 88. An indicator light 36 allows a user to quickly determine whether the corresponding heating assembly 88 is operating.

Figure 2:
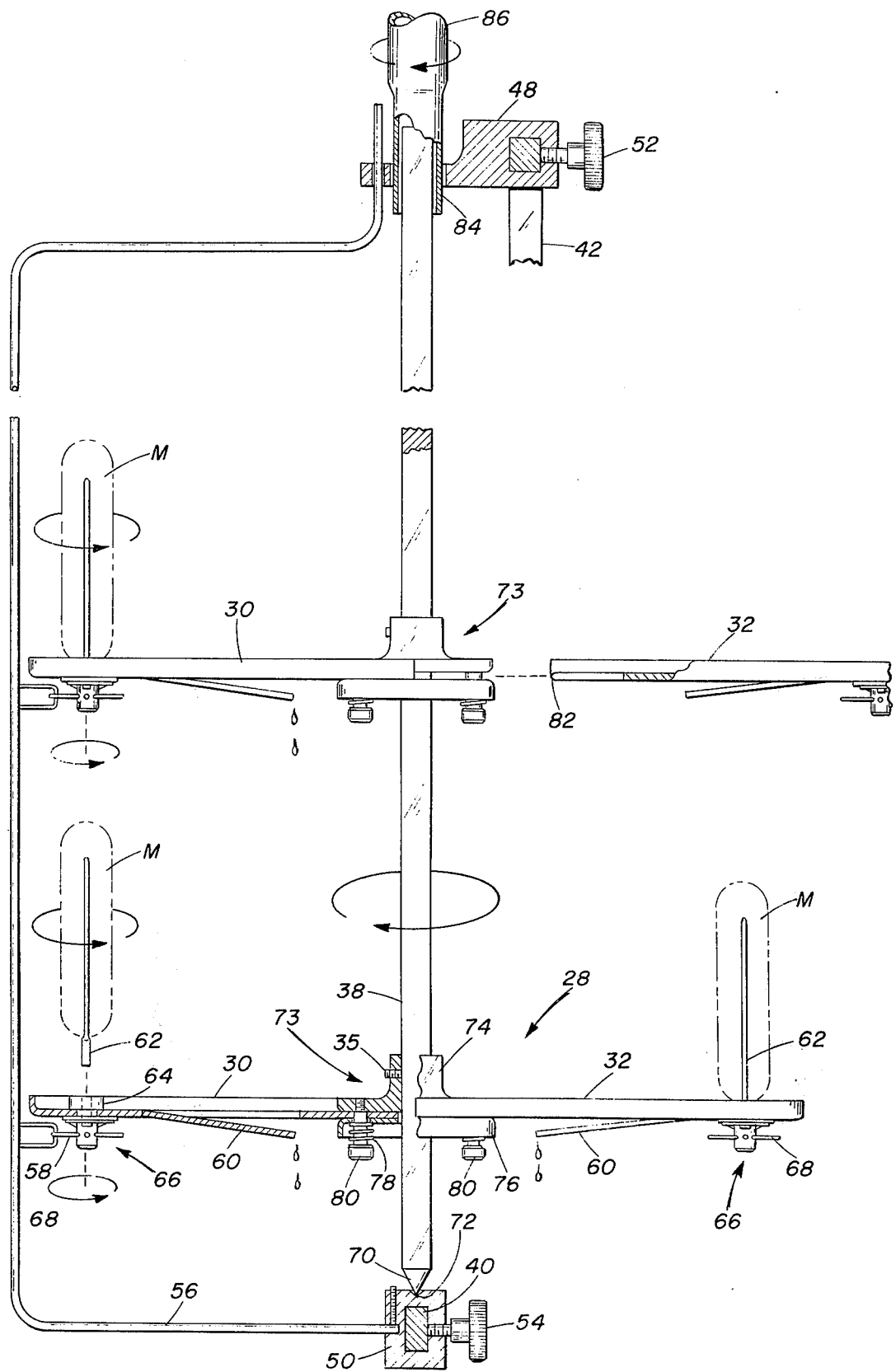
FIG. 2 is an elevation of a portion of the rotisserie and particularly illustrating the multiple cooking platforms and the operation thereof.

Referring now particularly to FIG. 2, the spit 38 is seen to be mounted for rotation between the top and bottom spit support rods 42 and 40. As previously indicated, the spit 38 is mounted at the top rod 42 by the bracket 38, which bracket 38 has a vertically facing aperture in which a sleeve 84 resides, the sleeve 84 being an extension of the drive shaft 86. The drive shaft 86 can be rotated manually through use of the hand wheel 46 or by a motor 44. The motor 44 has its drive socket permanently attached to the drive shaft 86 so that the motor 44 need not be connected and disconnected when changing from manual to powered operation of the rotisserie unit 10. The upper end 39 of the spit 38 fits into the sleeve 84, the spit 38 thus being rotated on rotation of the drive shaft 86. The spit 38 terminates at its lower end in a pivot point 70 which fits into a V-cavity 72 in the upper face of lower mounting bracket 50. The bracket 50 is slidable along the rod 40 and fixedly positionable thereon by means of a locking knob 54.

The spit 38 has a plurality of disc-like cooking platform assemblies 28 spaced vertically along its length. The platform assemblies 28 are comprised of semi-circular half sections 30 and 32 which are held together about the spit 38 by connectors 73, each connector 73 being formed of a collar 74, a spring plate 76, springs 78, and securing bolts 80. The half sections 30 and 32 are held between the collar 74 and spring plate 76, the collar 74 being secured to the spit 38 by the set screw 35 and the spring plate 36 being elastically urged toward the collar 74 by the springs 78 which ride on the bolts 80. A keyway 82 in each of the half sections 30 and 32 fits about one of the bolts 80 between the collar 74 and spring plate 76. Thus, each of the half sections 30 and 32 can be pulled in a snap-action fashion from connection with the spit 38. Conversely, the half sections can be similarly "snapped" onto the spit 38. Thus, the cooking platform assemblies 28 can be quickly mounted onto or removed from the rotisserie unit 10 during operation thereof with minimal production loss.

Figure 4:
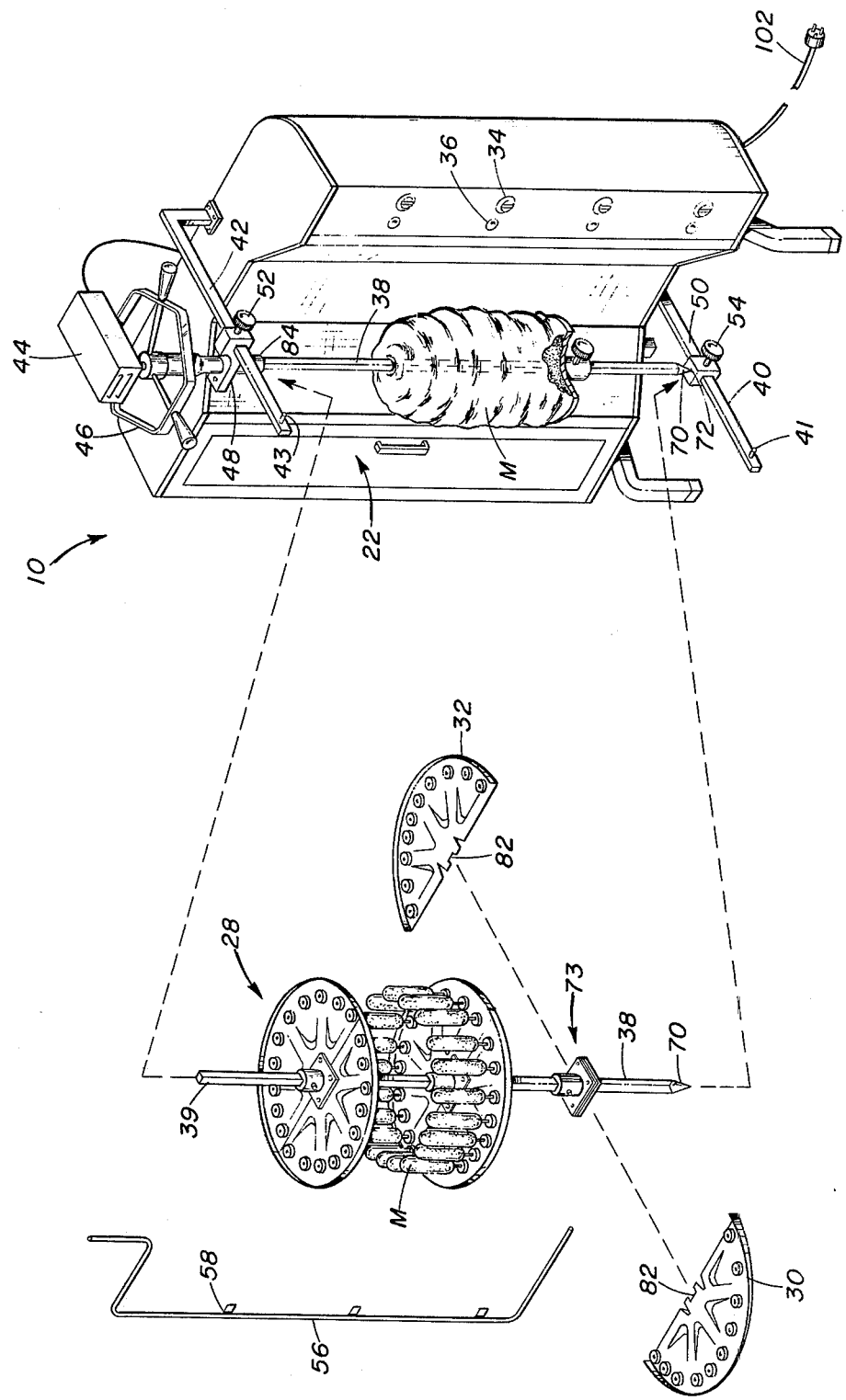

As can be seen in FIGS. 1, 2, and 4, individual portions of a foodstuff such as meat M can be roasted on the rotisserie unit 10. The portions M are impaled on disposable skewers 62, the bottom portions of which skewers 62 fit into pivotable holders 64. The holders 64 are mounted through the body of either of the half sections 30 and 32 by rotatable assemblies 66. The assemblies 66 have four arms 68 disposed thereon and spaced 90° apart, the arms extending from each assembly 66 in a plane perpendicular to the longitudinal axis of the spit 38. The arms 68 extend from the assemblies 66 and into contact with cams 58 which are mounted in operative relation to the arms 68 by means of a support bar 56. The bar 56 is mounted between the upper bracket 48 and the lower bracket 50, the bar 56 having a generally U-shape with the cams 58 being spaced on the base of the U-shaped bar. One each of the cams 58 extend from the bar 56 under each of the cooking platform assemblies 28 where contact with the arms 68 on the assemblies 66 is made. Rotation of the spit 38 causes the portion M on the periphery of the cooking platform assemblies 28 to be exposed periodically to the heating assemblies 88. However, rotation of the spit 38 also causes the arms 68 on the assemblies 66 to contact the stationary cams 58 of the bar 56, thus rotating each of the assemblies 66 one-quarter turn on each full rotation of the spit 38. Since the portions M are rotatably connected to the assemblies 66, the portions M are also rotated 90° on each full rotation of the spit 38. Thus, four rotations of the spit 38 causes each side of each portion M to be fully exposed to heat from the heating assemblies 88. As particularly seen in FIG. 2, the half sections 30 and 32 of the cooking platform assemblies 28 are fitted with drip channels 60 which direct drippings from the roasting portions M toward the spit 38. The channels 60 may be triangularly shaped cut-outs in the half sections 30 and 32 as best seen in FIGS. 1 and 4. The channels 60 direct the excess drippings toward the center of the rotisserie unit 10 where the drippings fall downwardly into a drip pan 26.

Referring particularly now to FIG. 4, it can be seen that the spit 38 holding the cooking platform assemblies 28 may be replaced as desired with a spit capable of mounting larger portions of meat held onto the spit by a plate, collar, and locking knob arrangement such as is described by me in U.S. Pat. No. 3,604,341. Thus, the present rotisserie unit is versatile in operation, allowing roasting of size-controlled portions as well as conventional roasting of large portions of meat or other foodstuffs. In the same fashion as occurs with larger portions of meat, the size-controlled portions M are located in the radiation focal lines of the oppositely disposed heating assembly 88, the portions M thus being self-blasting in a generally vertically descending helix from one end to the other of each of the portions M, the lower end of the portion receiving the most basting and thereby being more "rare" or juicy. Obviously, the heating assemblies 88 do not become fouled by drippings from the portions M due to the vertical nature of the rotisserie unit 10. additionally, contamination or burning of the drippings do not occur.

It is apparent that modifications and variations may be made to the invention as particularly described without departing from the scope of the invention as claimed hereinafter.

What is claimed is:
1. Rotisserie apparatus for cooking individual portions of a foodstuff, comprising:
  body means;
  heating means mounted on said body means;

spit means mounted for rotary movement on the body means;

platform means mounted on the spit means, the plane of said platform means being perpendicular to the longitudinal axis of the spit means, the platform means including disc-like members of two semi-circular half sections, which half sections make together about the spit means;

collar means fixedly carried on the spit means;

spring plate means carried on the spit means and opposing the collar means;

spring-based bolt means urging the collar means and spring plate means together, the half sections of the platform means fitting between the collar means and spring plate means on urging of the bolt means;

skewer means mounting said foodstuff portions about the periphery of the platform means;

means for rotating said skewer means on rotation of the spit means; and, means for rotating the spit means relative to the heating means, thereby to evenly cook the foodstuff portions.

2. The apparatus of claim 1 wherein a plurality of the platform means are spaced along the spit means, each of the platform means opposing one unit of a plurality of units comprising the heating means, the foodstuff portions on each of the platform means being heated by a separate unit of the heating means.

3. The apparatus of claim 1 wherein the heating means are mounted on said body means in an essentially arcuate conformation to direct heat substantially within a zone bounded by a dihedral angle having its apex as the focal line of the heating means.

4. The apparatus of claim 1 wherein the heating means are comprised of separately operable heating assemblies, the several assemblies being disposed regularly along and in opposed relation to the spit means, each of the heating assemblies directing heat onto a particular zone of the spit means opposing the heating assembly.

5. Rotisserie apparatus for cooking individual portions of a foodstuff, comprising:

body means;

spit means mounted for rotary movement on the body means;

heating means comprised of separately operable heating assemblies, the several assemblies being disposed regularly along and in opposed relation to the spit means, each of the heating assemblies directing heat onto a particular zone about the spit means opposing each heating assembly;

a plurality of platform means mounted on the spit means, the plane of each of said platform means being perpendicular to the longitudinal axis of the spit means, each of the platform means further opposing at least one of said heating assemblies, the foodstuff portions on each of the platform means being primarily heated by the heating assembly opposing each one of said platform means;

a plurality of skewer means mounting said food stuff portions individually about the periphery of the platform means;

means for rotating said skewer means on rotation of the spit means;

means for rotating the spit means relative to the heating means, thereby to evenly cook the foodstuff portions; and, means for separately controlling each of the heating assemblies, as few as one of said assemblies being operable at a given time substantially to cook only those foodstuff portions carried on the platform means disposed in opposed relation to the heating assembly.

6. The apparatus of claim 5, wherein the platform means comprise disc-like members formed of two semi-circular half sections, which half sections mate together about the spit means.

7. The apparatus of claim 6 and further comprising:

collar means fixedly carried on the spit means;

spring plate means carried on the spit means and opposing the collar means; and, spring-biased bolt means urging the collar means and spring plate means together, the half sections of the platform means fitting between the collar means and spring plate means on urging of the bolt means.

8. The apparatus of claim 5 wherein said means for rotating the skewer means comprises:

rotatable assemblies connected to one each of the skewer means and mounting said skewer means for rotation;

arms on the rotatable assemblies and extending therefrom in a plane perpendicular to the longitudinal axis of the spit means; and, cam means fixed to the housing means in a stationary fashion relative to the spit means, the arms on the rotatable assemblies contacting the cam means on rotation of the spit means, the rotatable assemblies thereby being rotated by the action of the cam means displacing the arms on said assemblies, the skewer means rotating on rotation of the rotatable assemblies.

9. The apparatus of claim 5 and further comprising drip channelling means in the platform means, the drip channelling means directing drippings from the foodstuffs toward the spit means for collection in a location centrally oriented with respect to the rotisserie apparatus.

10. The apparatus of claim 9 wherein the drip channelling means comprise triangularly shaped cut-out members located on the half sections and interiorly of the peripheral skewer means, each of the members opposing at least one of said skewer means, and slanting downwardly therefrom, drippings from the skewer means moving along the members toward the longitudinal axis of the spit means and through the triangularly-shaped holes fromed in the half sections on formation and downward slanting of the cut-out members to a point of collection.

11. The apparatus of claim 5 and further comprising warming oven means formed in the body means, the oven means utilizing excess heat energy from the heating means to warm additional foodstuffs placed therein.

12. The apparatus of claim 11 wherein the warming oven means has at least one interior wall spaced from the heating means, the interior wall being uninsulated to allow the heating means to warm foodstuffs within the warming oven means.

13. The apparatus of claim 5 wherein the means for rotating the spit means comprises motor means and drive shaft means extending from the motor means and mounting one end of the spit means for rotation, the drive shaft means being further fitted with hand wheel means for manual rotation of the spit means.

14. The apparatus of claim 13 wherein the hand wheel means is carried directly on the drive shaft means which extends directly from the motor means.

15. The apparatus of claim 5 and further comprising screen means disposed between the heating means and the spit means to protect the heating means.

16. The apparatus of claim 5 wherein the heating assemblies are mounted on said body means in an essentially arcuate conformation to direct heat substantially within a zone bounded by a dihedral angle having its apex as the focal line of the heating means.

* * * * *